United States Patent [19]

Fair

[11] 3,792,751

[45] Feb. 19, 1974

[54] AIR CUSHION SEISMIC SIGNAL SOURCE
[75] Inventor: Delbert W. Fair, Ponca City, Okla.
[73] Assignee: Continental Oil Company, Ponca City, Okla.
[22] Filed: Aug. 2, 1972
[21] Appl. No.: 277,434

[52] U.S. Cl............................. 181/.5 VM, 340/17
[51] Int. Cl............................................. G01v 1/22
[58] Field of Search.......... 181/.5 VM, .5 EC, .5 H; 180/116, 117; 340/17

[56] References Cited
UNITED STATES PATENTS

| | | | |
|---|---|---|---|
| 3,701,968 | 10/1972 | Broding | 181/.5 VM |
| 3,547,218 | 12/1970 | Hamilton | 181/.5 VM |
| 3,379,272 | 4/1968 | Brooks | 181/.5 H |
| 3,514,071 | 5/1970 | Moffatt | 181/.5 H |

Primary Examiner—Samuel Feinberg
Assistant Examiner—J. V. Doramus
Attorney, Agent, or Firm—William J. Miller

[57] ABSTRACT

An air cushion seismic signal source having a plenum chamber, a source of compressed air connected to the plenum chamber, and an air cushion attached to the underside of the plenum chamber, a restricted air passage couples the plenum chamber to the air cushion, a spool valve is attached to the plenum chamber so that air passes from the plenum chamber through the valve and into the air cushion when the spool valve is operated in one direction and from the air cushion to the atmosphere when the spool valve is operated in the other direction, the pressuring and depressuring of the air cushion causing a seismic signal to be generated into the earth.

8 Claims, 6 Drawing Figures

AIR CUSHION SEISMIC SIGNAL SOURCE

BACKGROUND OF THE INVENTION

This invention is related to application Ser. No. 174,343 filed Aug. 24, 1971, now U.S. Pat. No. 3,727,717, entitled "Air Coupled Seismic Energy Generator" by Dale E. Miller, said application being assigned to the same assignee as this application.

BRIEF DESCRIPTION OF THE PRIOR ART

In the past there have been various devices constructed for producing a vibrational energy input into the earth, commonly referred to as "vibrators," which were utilized for seismic prospecting, the method and apparatus being described in the U.S. Pat. No. 2,668,128 issued to Doty et al. Some vibrators have been constructed for generating seismic waves within a water medium such as described in the U.S. Pat. No. 3,482,648, issued to G. L. Brown et al., for example; and there have also been vibrators constructed for utilization in a swampy or marshland type of area such as described in the U.S. Pat. No. 3,365,019, issued to M. G. Bays, for example (the Doty, the Brown, and the Bays patents each being assigned to the assignee of the present invention). A seismic vibrator design has recently been suggested wherein air was supplied to a plenum chamber of an air cushion vehicle through an air modulating apparatus, the plenum chamber and the air modulating apparatus being constructed to create a modulated pressure wave which was applied to the earth surface.

Application Ser. No. 174,343, above referenced, discloses a system for modulating the air pressure in the air cushion of a hovercraft by applying a physical force to the top of the plenum chamber. The force thus applied physically lifts and drops the entire hovercraft by an amount sufficient to modulate the air pressure inside the hovercraft, thus generating a seismic signal into the ground.

SUMMARY OF THE INVENTION

This invention differs from the above-described application and the prior art by modulating a percentage of the compressed air entering the air cushion under the vibrator. The modulation is performed by utilizing a spool valve which permits entry of compressed air from the plenum chamber through the spool valve and into the air cushion when the valve is displaced in one direction and shuts off the compressed air to the plenum chamber along with venting the pressured air in the air cushion to the atmosphere when the spool valve is displaced in the opposite direction. Some air is always supplied to the air cushion at a constant rate from the plenum chamber so that the hovercraft will continue to "fly" whether or not modulation is being applied to the air cushion.

BRIEF DESCRIPTION OF THE DRAWINGS

FIG. 3b is a cross-sectional side view of the valve spool shown in FIG. 3a;

FIG. 4b is a cross-sectional side view of the valve body shown in FIG. 4a.

Figure 1:
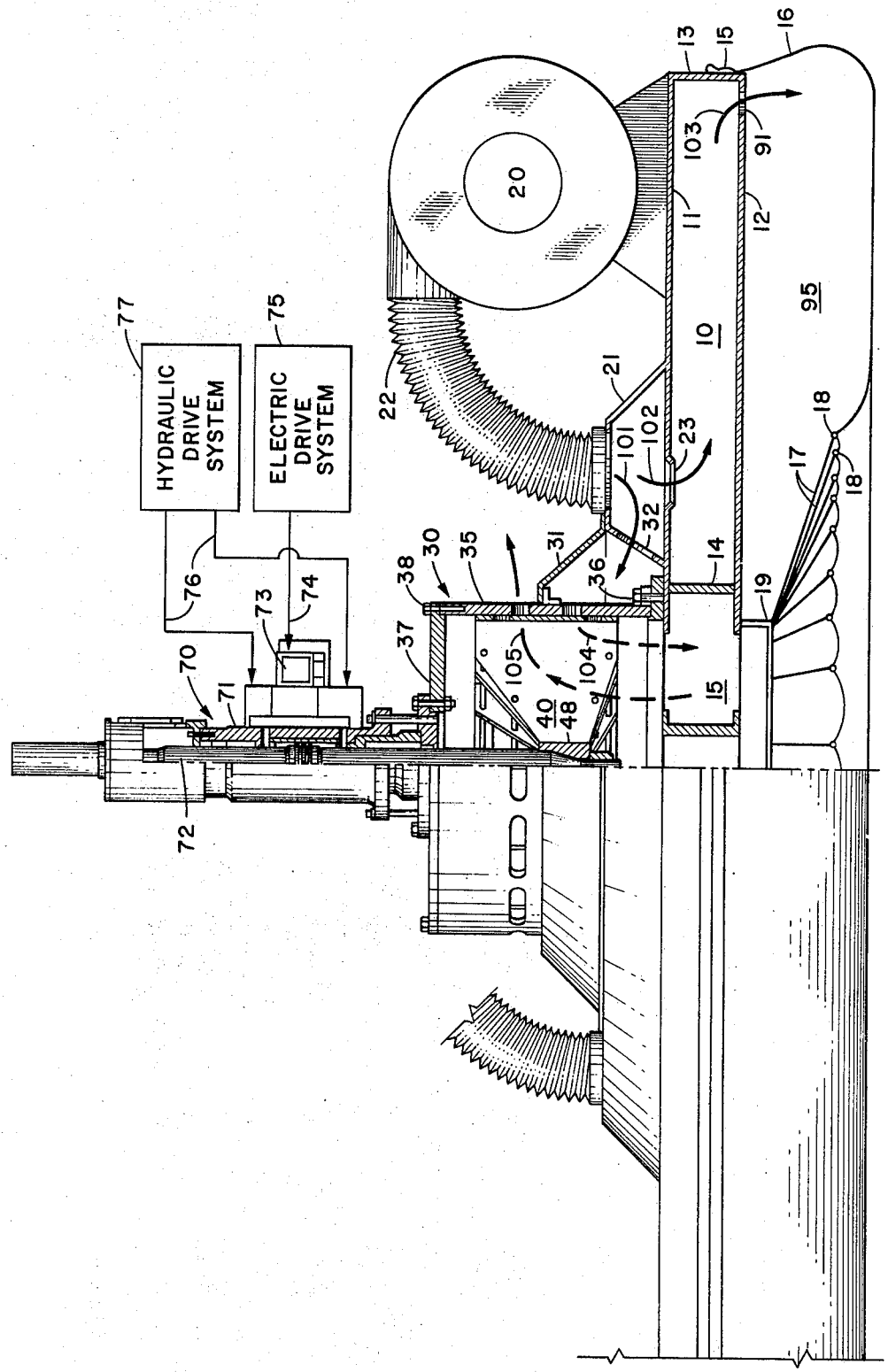
FIG. 1 is a drawing of the air cushion seismic signal source where approximately ½ of the signal source is in cross-section and the remaining portion in full view.
Figure 2:
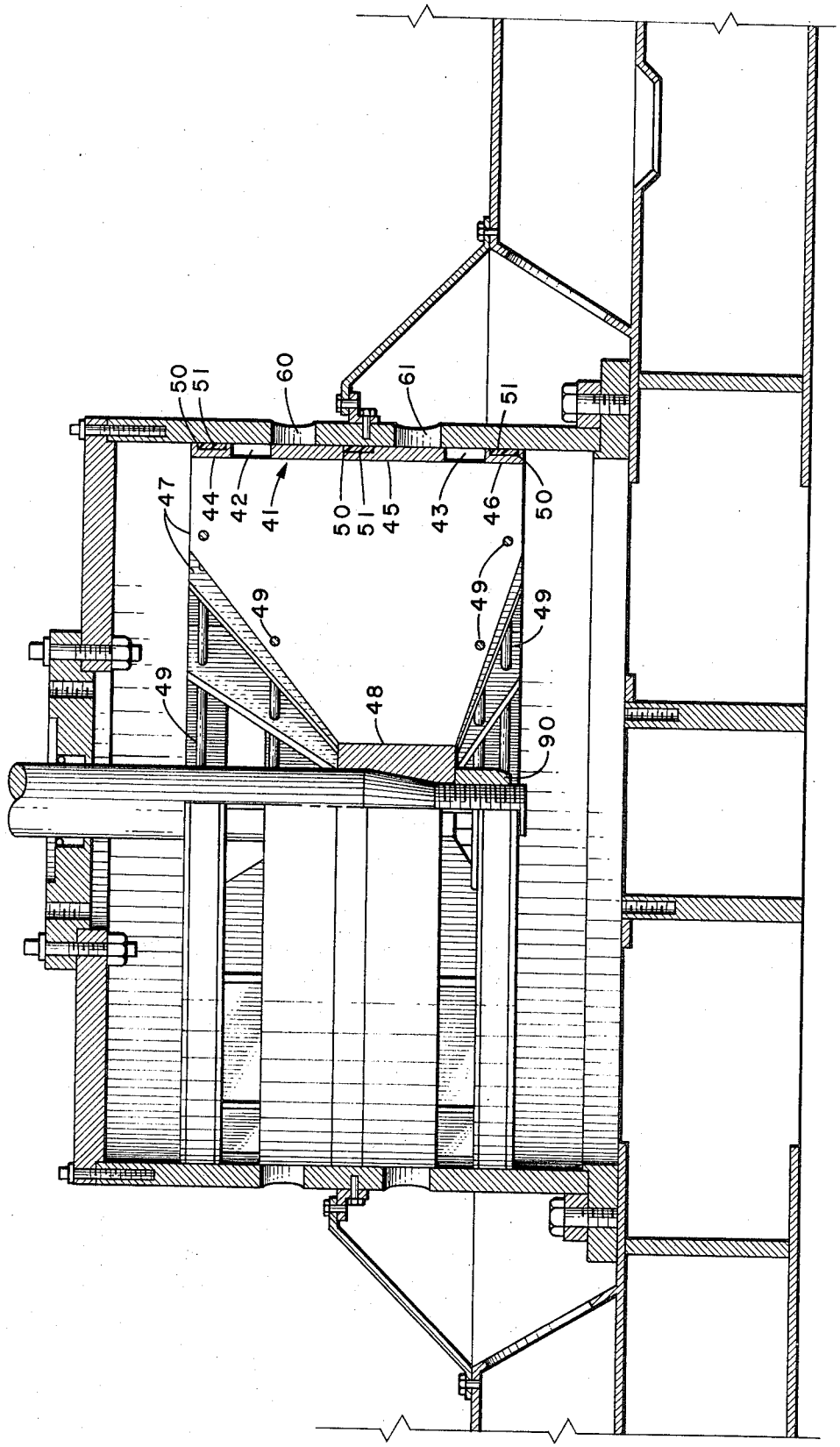
FIG. 2 is a detailed cross-sectional drawing of the air modulation spool valve assembly.
Figure 3A:
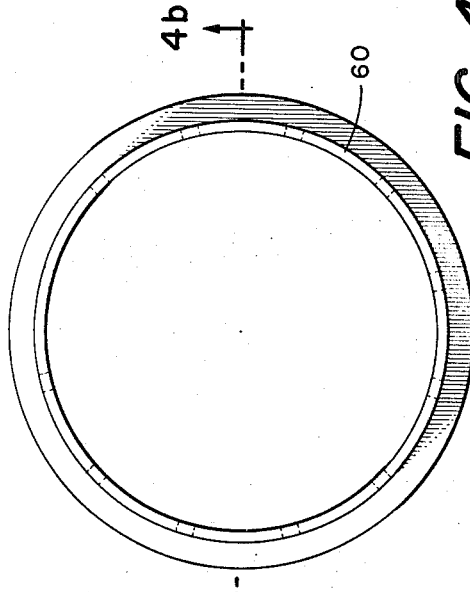
FIG. 3a is a top view of the valve spool.
Figure 4A:
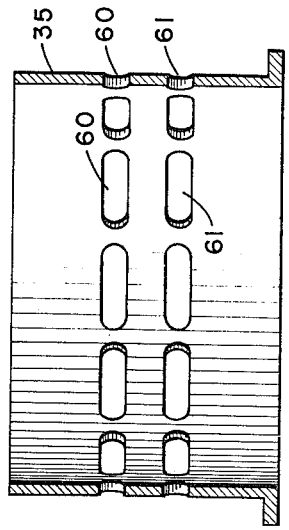
FIG. 4a is the top view of the valve body.
Figure 3B:
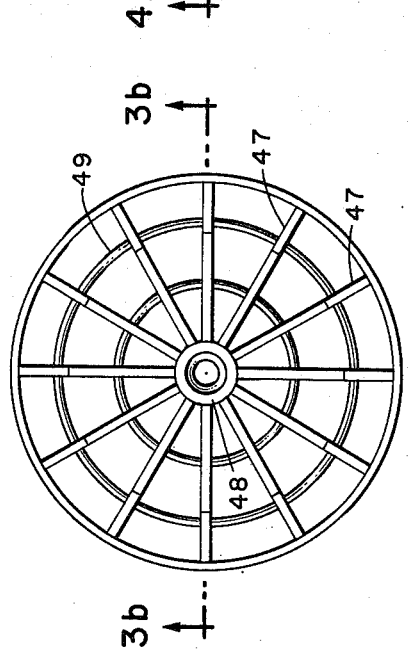
Figure 4B:
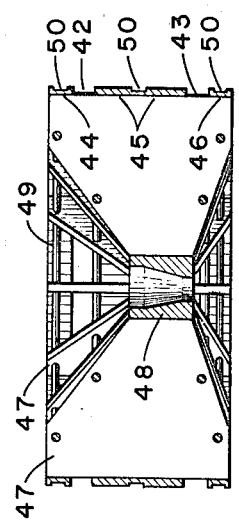

Referring to all of the drawings in general and in particular to FIGS. 1 and 2, a seismic energy generating apparatus is illustrated having a plenum chamber 10 having a top wall 11, a bottom wall 12, and side walls 13 and 14. The plenum chamber is generally torroidal in shape having opening 15 to permit the passage of air therethrough. A skirt 16 is attached at 15 by any well known method, such as banding or screws, to side wall 13 of plenum chamber 10. Skirt 16 has a plurality of stabilizing wires 17 attached to skirt 16 at point 18 and to plenum chamber 10 at point 19. A source of compressed air 20 is connected to a duct 21 by means of a hose 22. Duct 21 has a passage 23 into plenum chamber 10. Passage 23 generally comprises a plurality of spaced holes around plenum chamber 23. Duct 21 like plenum chamber 10 is generally in the form of a torroid. A spool valve generally referred to as 30 is connected to duct 21 through a second duct 31. A passage 32 permits compressed air to pass from duct 21 to duct 31. Spool valve 30 essentially comprises a cylindrical outer shell 35 attached to plenum chamber 10 by means of a plurality of bolts 36. A top 37 covers the upper portion of spool valve 30 and is attached to said cylindrical outer shell by means of a plurality of screws 38. A valve spool 40 is mounted inside cylindrical shell 35 and consists of an outer cylindrical shell 41 (see FIG. 2) having ports 42 and 43 which are formed by three cylindrical bands 44, 45, and 46, respectively. Ribs 47 are attached beween a core 48 and cylindrical bands 44 through 46 to offer support for the cylindrical bands. Ribs 47 are further strengthened by circular reinforcing rods 49. A groove 50 is cut into each of the cylindrical bands 44, 45, and 46. Placed in grooves 50 is a plastic bearing surface 51. The plastic bearing is made from fluorocarbon material. The actual type used in a spool valve manufactured in accordance with the drawing is made under the trade name RULON. Each of the bands is bonded by use of adhesive into grooves 50. The fluorocarbon provides a free moving surface which does not mar or scratch when foreign material is introduced accidentally into the valve. A plurality of ports 60 and 61 is formed in the outer cylindrical shell (see FIG. 4b). In the embodiment shown in FIGS. 4a and 4b, the ports are made nearly continuous around the diameter of outer cylindrical shell 35. Port 60 will vent the interior of the spool valve to the atmosphere while port 61 will permit passage of air from duct 31 to the interior of spool valve 30. A hydraulic actuator generally referred to as 70 consists of an outer cylinder 71 and an internal piston 72. A servo control valve 73 is connected through circuit 74 to an electrical drive system 75. The hydraulic system is connected through conduit 76 to a source of hydraulic pressured fluid 77. Piston 72 is connected through suitable bearings to center core 48 and is connected thereto by any suitable means, such as a threaded screw 90. An opening 91 forms a passage from plenum chamber 10 to an air cushion reservoir 95 which is under plenum chamber 10. Opening 91 generally consists of a plurality of ports or air passageways spaced on a diameter around the plenum chamber. Ports 91 are dimensioned so that the air in plenum chamber 10 will thus be maintained at a pressure in excess of that confined in air cushion reservoir 95.

OPERATION

The operation of the overall seismic source is best explained by referring essentially to FIG. 1. Compressed air source 20, which is usually a fan, applies a high volume of air into duct 21 which passes into duct 31 and plenum chamber 10 in the direction of arrows 101 and 102, respectively. When plenum chamber 10 becomes pressured, air will pass in the direction of arrow 103 through port 91 into the air cushion reservoir 95. The air pressure and volume from source 20 will cause the entire vibrator system to lift from the ground; however, due to the size of opening 91 the air pressure in plenum chamber 10 will most always exceed by a substantial amount the air pressure in air cushion reservoir 95. Sufficient volume must pass through opening 91, of course, to provide the lift necessary for the air cushion source to hover over the ground. Hydraulic drive system 77 is pressured, thereby transmitting high pressure hydraulic fluid to servo control valve 73 and subsequently to hydraulic actuator 70. The electric drive system 75 will supply a sinusoidal control voltage to the electrical input via wires 74 to servo control valve 73. Control valve 73 will move piston 72 upwards and downwards inside cylinder 71 in correspondence to the signal from electric drive system 75. Valve spool 40 will likewise move up or down inside the cylindrical outer shell 35 in direct correspondence to the movement of the piston. If, for example, valve spool 40 is moving up, port 43 will move into axial alignment with port 61, permitting compressed air to pass through the ports in the direction of arrow 104 into the air cushion reservoir 95 increasing the pressure of the air cushion reservoir. The increased air pressure will generate a force on the surface of the ground which force has a magnitude determined by the product of the area of the ground exposed to the pressure and the pressure increase (or decrease) over the static force generated over the same surface of the ground which is causing the craft to hover (i.e., air passing through ports 91 into reservoir 95). As valve spool 40 moves downward, it will close off port 61 and begin to open port 60. Compressed air from the air cushion reservoir 95 will then pass in the direction of arrow 105, thus venting the air cushion reservoir to the atmosphere. This venting will cause a reduction in air pressure in the air cushion 95, thereby causing a corresponding decrease in the force on the surface of the earth in the opposite direction. The force thus generated in the earth will be in a sine wave corresponding to the sine wave generated by electric drive system 75.

In an apparatus constructed in accordance with this invention, a plenum chamber having an area of 9,150 square inches had a total weight, including the skirt, of 3,100 pounds. Models were also tested having weights of 2,100 pounds and 4,100 pounds. The spool valve and piston rod had a weight of 200 pounds. The hydraulic stroke peak-to-peak was 3 inches. A piston area of 3.12 square inches, a hydraulic pressure of 2,500 psi, a hydraulic pump output of 53 gallons per minute, and a compressed air blower rate of 10,244 cubic feet per minute which generated one pound per square inch inside the plenum chamber under atmospheric pressure was used. In the model tested the air supply system and the hydraulic supply system were mounted separately on a truck which was also used to tow the air cushion seismic source. The air pressure in the air cushion had a static pressure of approximately ½ pound per square inch.

The spool valve outer cylinder was two feet in diameter with a row of input ports and a row of exhaust ports having a maximum area of 95 square inches. With the valve spool 40 in the centered position as shown in FIGS. 1 and 2, the overlap between ports 42 and 60 or ports 43 and 61 was approximately 0.030 of an inch. The performance of the prototype built and tested in accordance with the above specification compared favorably with that of a mechanical vibrator built in accordance with U.S. Pat. No. 3,365,019 by M. G. Bays.

While a hydraulic drive system is disclosed, it is obvious that other type drive systems can be used to move the spool valve in accordance with this invention. For example, an electric drive can be incorporated or a mechanical eccentric drive can easily be substituted. The main purpose for describing the hydraulic system is the contemplated use as a precisely controlled seismic energy sweep signal generation system useful in a seismic energy exploration technique described in the patent to W. E. N. Doty et al., U.S. Pat. No. 2,668,128.

Obvious changes and modifications can be made in the valve which are clearly within the scope of this invention. For example, the spool can be mounted external, or the valve instead of being circular could be flat. The valve disclosed, however, appears to be the preferred method for constructing a valve useful in a hovercraft type seismic energy source. All such modifications, however, are clearly contemplated by the description given in the specification and the appended claims.

What I claim is:

1. In an air cushion seismic signal source having a plenum chamber, an air cushion attached to one side of said plenum chamber, a source of compressed air connected to said plenum chamber, passage means between said plenum chamber and said air cushion of a size to maintain the air pressure in said plenum chamber greater than that in the air cushion, a valve actuation means and a piston, an air cushion air pressure modulator means comprising:

a chamber having first and second spaced port means therethrough and an air passage means to said air cushion, said first port means communicating with the atmosphere, said second port means communicating with said plenum chamber, valve means slidably mounted over said port means and having first and second openings therethrough, said openings spaced apart by a distance greater than the spaced distance between said first and second ports said first and second openings positioned in slidable communication with said first and second ports respectively, and means for attaching said valve means to said piston.

2. An air cushion air pressure modulator means as described in claim 1 wherein said chamber is cylindrical and wherein said first and second spaced ports each comprises a plurality of openings through said cylinder axially aligned and spaced from each other.

3. An air cushion air pressure modulator means as described in claim 2 wherein said valve means comprises a cylinder dimensioned to fit slidably within said cylindrical chamber and wherein said first and second openings each comprise a plurality of openings along a diameter of said cylinder.

4. An air cushion air pressure modulator means as described in claim 3 wherein the outer diameter of said cylinder has a plurality of diametrical grooves formed therein and a band of fluorocarbon filling said grooves and having a diameter greater than the diameter of said cylinder.

5. An air cushion seismic signal source having a source of compressed air comprising a plenum chamber; means for conducting said source of compressed air into said plenum chamber; an air cushion attached to one side of said plenum chamber; air passage means between said plenum chamber and said air cushion, said air passage means dimensioned to maintain the pressure of said compressed air in said plenum chamber substantially higher than the pressure of the compressed air in said air cushion; an air cushion air pressure modulating means comprising a chamber having first and second spaced port means therethrough and an air passage means to said air cushion, said first port means communicating with the atmosphere, said second port means communicating with said plenum chamber, valve means slidably mounted over said port means and having first and second openings therethrough, said openings spaced apart by a distance greater than the spaced distance between said first and second ports said first and second openings positioned in slidable communication with said first and second ports respectively, and means for attaching said valve means to said piston.

6. An air cushion seismic signal source as described in claim 5 wherein said chamber comprises a cylinder having a top and bottom wherein said top is closed and said bottom is attached to said air cushion and wherein said valve means comprises a second cylinder mounted inside said first-mentioned cylinder and wherein said valve actuation means is attached between the top of said first-mentioned cylinder and said second cylinder.

7. An air cushion seismic signal source as described in claim 6 wherein said valve actuation means comprises a hydraulic actuation means, a servo control valve connected to said hydraulic actuation means, an electrical drive system electrically connected to said servo control valve.

8. An air cushion air pressure modulator means as described in claim 7 wherein the outer diameter of said cylinder has a plurality of diametrical grooves formed therein and a band of fluorocarbon filling said grooves and having a diameter greater than the diameter of said cylinder.

* * * * *